(12) United States Patent
Finlayson et al.

(10) Patent No.: US 12,150,403 B2
(45) Date of Patent: Nov. 26, 2024

(54) SEED METER

(71) Applicant: Great Plains Manufacturing, Inc., Salina, KS (US)

(72) Inventors: Keith W. Finlayson, Gypsum, KS (US); Bruce D. Peterson, Lindborg, KS (US); Jeff Welsh, Abilene, KS (US)

(73) Assignee: Great Plains Manufacturing, Inc., Salina, KS (US)

( * ) Notice: Subject to any disclaimer, the term of this patent is extended or adjusted under 35 U.S.C. 154(b) by 953 days.

(21) Appl. No.: 17/179,587

(22) Filed: Feb. 19, 2021

(65) Prior Publication Data

US 2021/0168993 A1 Jun. 10, 2021

Related U.S. Application Data

(63) Continuation of application No. 16/017,534, filed on Jun. 25, 2018, now Pat. No. 10,973,164.

(51) Int. Cl.
*A01C 7/12* (2006.01)
(52) U.S. Cl.
CPC ..................... *A01C 7/12* (2013.01)
(58) Field of Classification Search
CPC .. A01C 7/12; A01C 7/085; A01C 7/08; A01C 7/123; A01C 7/127
See application file for complete search history.

(56) References Cited

U.S. PATENT DOCUMENTS

| | | | |
|---|---|---|---|
| 2,203,771 A * | 6/1940 | Bennett | A01C 7/127 222/163 |
| 3,788,529 A | 1/1974 | Christy | |
| 3,807,643 A * | 4/1974 | Bowerman | A01C 7/02 239/683 |
| 4,121,733 A * | 10/1978 | McRoskey | A01C 15/02 222/611.1 |
| 4,307,822 A | 12/1981 | Hardesty | |
| 4,548,362 A * | 10/1985 | Doering | A01C 17/00 239/685 |
| 5,024,356 A | 6/1991 | Gerling et al. | |
| 6,138,927 A * | 10/2000 | Spear | A01C 15/02 239/666 |
| 6,945,481 B2 * | 9/2005 | Thompson | A01C 7/08 239/650 |
| 7,083,069 B2 | 8/2006 | Wysong et al. | |

(Continued)

*Primary Examiner* — Jamie L McGowan
(74) *Attorney, Agent, or Firm* — Hovey Williams LLP; Kameron D. Kelly

(57) ABSTRACT

A seed meter for dispensing seed. The seed meter comprises a housing at least partially enclosing an interior space. The housing includes a top surface defining a seed inlet, and further includes a seed outlet. The seed meter additionally includes a metering wheel positioned within the interior space of the housing. The metering wheel is configured to carry seed through the housing when rotating in a first direction or in a second direction. The seed meter further includes a pair of retractable seed guards positioned within the interior space of the housing. The seed guards are each configured to be selectively configured in an operating configuration and in a retracted configuration. In the operating configuration the seed guards are configured to prevent excess seed from passing through the seed meter, and in the retracted configuration the seed guards are configured to permit large obstacles to pass through the seed meter.

18 Claims, 12 Drawing Sheets

(56) References Cited

U.S. PATENT DOCUMENTS

| | | |
|---|---|---|
| 8,166,895 B2 | 5/2012 | Dean |
| 8,701,575 B2 | 4/2014 | Friggstad |
| 8,931,424 B2 | 1/2015 | Friggstad |
| 8,931,425 B2 | 1/2015 | Friggstad |
| 9,148,990 B2 | 10/2015 | Redman et al. |
| 9,635,803 B2 | 5/2017 | Gray et al. |
| 9,657,451 B2 * | 5/2017 | Delorme .............. A01C 17/001 |
| 2003/0057303 A1 * | 3/2003 | Thompson ............. A01C 7/163 |
| | | 239/665 |
| 2006/0054722 A1 * | 3/2006 | Jones ................... A01C 17/001 |
| | | 239/663 |
| 2014/0303834 A1 | 10/2014 | Kowalchuk |
| 2014/0312055 A1 * | 10/2014 | Rans ...................... A01C 7/046 |
| | | 221/258 |
| 2015/0129620 A1 * | 5/2015 | Sammons .............. A01C 15/02 |
| | | 222/623 |
| 2015/0271988 A1 | 10/2015 | Gray et al. |
| 2015/0315759 A1 * | 11/2015 | Delorme .............. A01C 17/001 |
| | | 239/683 |
| 2016/0120110 A1 | 5/2016 | Gervais et al. |
| 2017/0359951 A1 * | 12/2017 | Horeth ................ A01C 17/001 |
| 2019/0327884 A1 * | 10/2019 | Horeth ................ A01C 17/001 |
| 2020/0187411 A1 * | 6/2020 | Sevrey ................ B05B 12/002 |

* cited by examiner

SEED METER

CROSS-REFERENCE TO RELATED APPLICATION

This application is a continuation patent application of U.S. patent application Ser. No. 16/017,534, which was filed on Jun. 25, 2018, the entire disclosure of which is incorporated herein by reference.

FIELD OF THE INVENTION

Embodiments of the present invention are directed generally to a seed meter. More particularly, embodiments of the present invention relate to a seed meter that can be used to meter seed from an agricultural seed planting machine.

BACKGROUND OF THE INVENTION

Agricultural seed planting machines often incorporate the use of seed meters to aid in planting seed onto and/or into the ground. Such seed meters are configured to meter seed from a seed bin down onto and/or into the ground. Generally, a seed planting machine will include a transmission system for transmitting power (e.g., rotation) to the seed meters to facilitate such metering. The transmission system will often be powered by one or more rotating components, such as the seed planting machine's wheels, rollers, disc assemblies, or the like. During use of the seed planting machine, the rotating components generally rotate in response to movement of the machine. For example, if a seed planting machine travels in a first direction, the rotating components will similarly rotate in a first direction. Alternatively, if the seed planting machine travels in a second direction, the rotating components will similarly rotate in a second direction. Because the seed meters of the seed planting machines are directly linked to the rotating components via the transmission systems, the seed meters will be driven regardless of the direction in which the seed planting machines are moving.

However, many previously-used seed meters are only configured to be driven in a single direction. As such, these seed meters can be damaged if they are driven in an opposite direction than for which they were designed. Notwithstanding such limitations, it is often necessary to move the seed planting machines in more than a single direction. It would be desirable to move the seed planting machines in more than one direction without damaging the seed meters.

In addition, many previously-used seed meters were configured to meter only a specific type or a specific size of seed. If the previously-used seed meters encountered a large obstacle, such as a rock or other debris, such a large obstacle could enter the seed meter and cause damage to or interrupt operation of the seed meter. As such, it would be desirable for seed meters to encounter and process large obstacles without causing damage to or otherwise interfering with operation of the seed meters.

SUMMARY OF THE INVENTION

In one embodiment of the present invention, there is provided a seed planting machine for dispensing seed onto and/or into the ground. The seed planting machine comprises a seed bin configured to hold seed, and at least one seed meter associated with the seed bin and configured to meter seed from the seed bin. The seed meter comprises a housing at least partially enclosing an interior space, with the housing including a top surface defining a seed inlet. The housing further includes a seed outlet. The seed meter additionally comprises a metering wheel positioned within the interior space of the housing. Rotation of the metering wheel provides for seed to travel through the seed meter from the seed inlet to the seed outlet. The seed meter further includes a retractable seed guard positioned within the interior space of the housing and configured to be selectively configured in an operating configuration and in a retracted configuration. In the operating configuration the seed guard is configured to restrict excess seed from passing through the seed meter. In the retracted configuration, the seed guard is configured to permit obstacles to pass through the seed meter.

In another embodiment of the present invention, there is provided a seed meter for dispensing seed. The seed meter comprises a housing at least partially enclosing an interior space. The housing includes a top surface defining a seed inlet, and further includes a seed outlet. The seed meter additionally includes a metering wheel positioned within the interior space of the housing. The metering wheel comprises a plurality of fluted sections on an exterior radial surface of the metering wheel. The metering wheel is configured to carry seed through said housing regardless of whether the metering wheel is rotating in a first direction or in a second direction. The seed meter further includes a pair of retractable seed guards positioned within the interior space of the housing. The seed guards are each configured to be selectively configured in an operating configuration and in a retracted configuration. In the operating configuration the seed guards are configured to prevent excess seed from passing through the seed meter, and in the retracted configuration the seed guards are configured to permit obstacles to pass through the seed meter.

In yet another embodiment of the present invention, there is provided a method for planting seed with a seed planting machine. The method comprises a step of providing one or more seed meters in association with a seed bin. The seed meters each include a housing that presents a seed inlet and a seed outlet, and a metering wheel positioned within the housing. The method includes the additional step of travelling in a first direction with the seed planting machine. During such travelling, the step further includes metering seed from the seed bin via the metering wheel rotating in a first direction. The method includes a further step of travelling in a second direction with the seed planting machine. During such travelling, the step further includes metering seed from the seed bin via the metering wheel rotating in a second direction.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE FIGURES

Embodiments of the present invention are described herein with reference to the following drawing figures, wherein.

Figure 1:
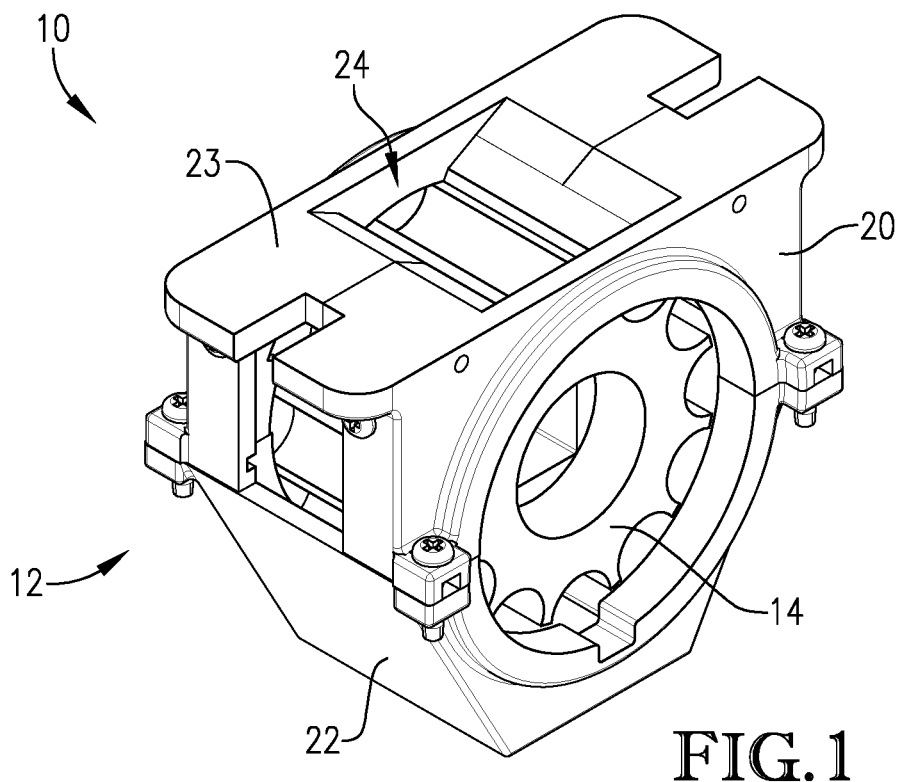
FIG. 1 is a front, side, and top perspective view of a seed meter according to embodiments of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the present invention references various embodiments. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Figure 2:
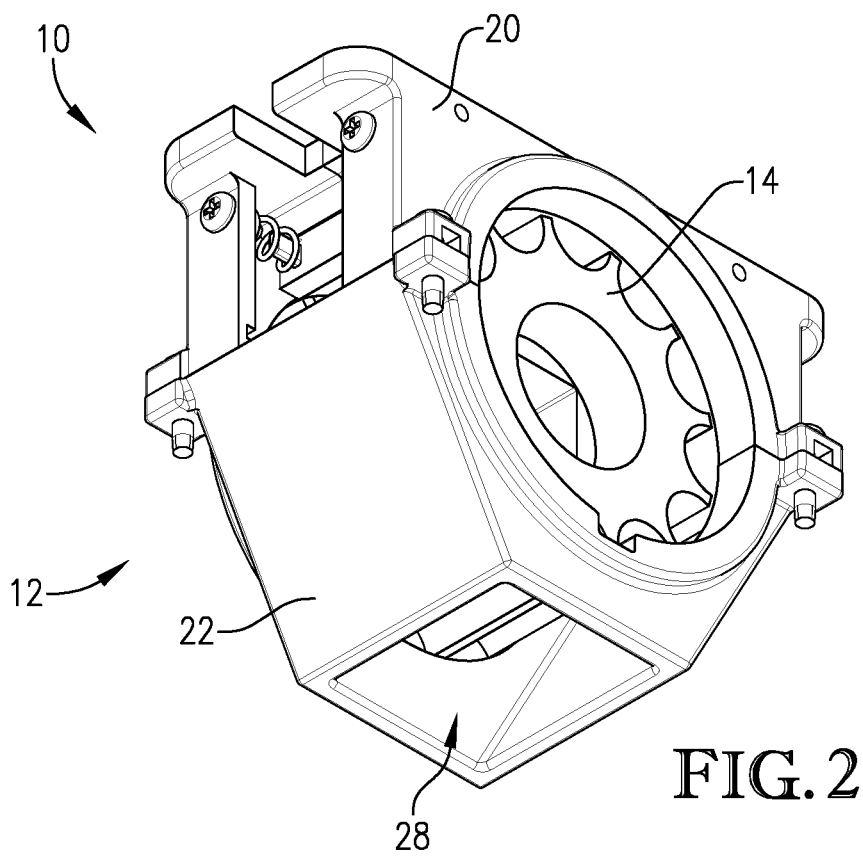
FIG. 2 is a front, side, and bottom perspective view of the seed meter of FIG. 1.
Figure 3:
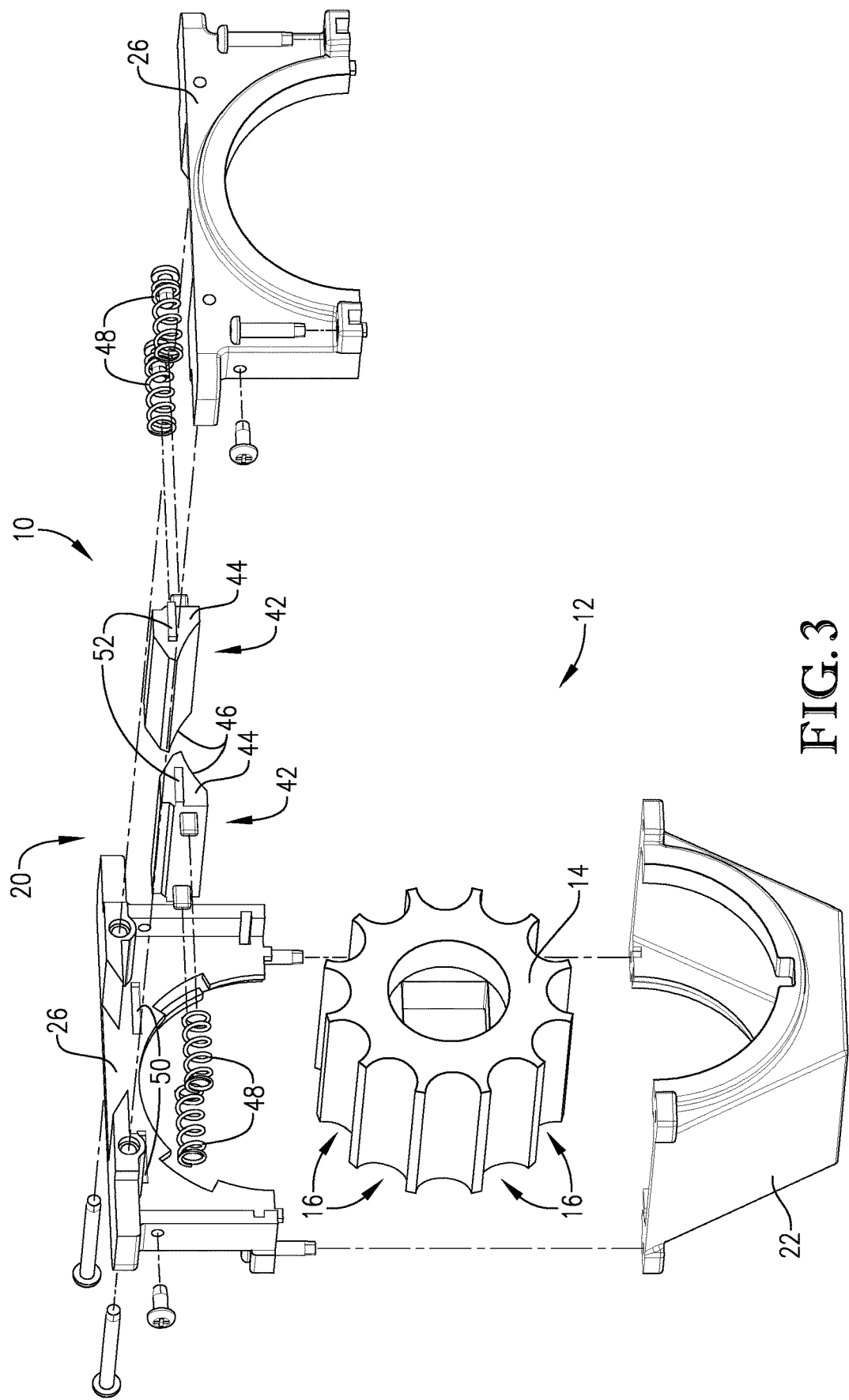
FIG. 3 is a front and side exploded view of the seed meter of FIGS. 1 and 2.

Broadly, embodiments of the present invention are directed to a seed meter 10, as illustrated in FIGS. 1-3, which can be used to meter or dispense seed from a seed planting machine. The seed meter 10 may comprise a housing 12 that encloses an interior space and is configured to hold a fluted metering wheel 14. The metering wheel 14 is perhaps best shown in FIG. 3. As will be described in more detail below, the metering wheel 14 is configured to rotate so as to facilitate the dispensing of seed from the seed planting machine (not shown in FIGS. 1-3). The metering wheel 14 may be formed as a wheel or a drum with a plurality of fluted sections 16 formed along an exterior radial surface of the metering wheel 14. The fluted sections 16 may extend generally along the entire lateral width of the metering wheel 14 in a direction that is generally parallel with an axis of rotation of the metering wheel 14. Each of the fluted sections 16 may, in some embodiments, be substantially identical. In certain embodiments, each of the fluted sections 16 may have a uniform shape or cross-section, with such uniformity extending along the length of the fluted section 16. In addition, the fluted sections 16 may be uniformly spaced apart from adjacent fluted sections 16, such that the fluted sections 16 are uniformly spaced circumferentially around the exterior radial surface of the metering wheel 14. Given such positioning and uniformity of the fluted sections 16, the metering wheel 14 of embodiments of the present invention is suitably configured to meter seed when rotating in either rotational direction (i.e., clockwise or counterclockwise).

In some embodiments, the housing 12 may comprise an upper portion 20 and a lower portion 22. Such upper and lower portions 20, 22 may, in some embodiments, be separable from each other but secured together via vertically-orientated fasteners. The upper portion 20 may, as perhaps best shown in FIG. 1, include a top surface 23 that defines a seed inlet 24, which may be in the form of an opening or a portal through which seed may pass to enter the interior space of the housing 12, as will be discussed in more detail below. In certain embodiments, the upper portion 20 may, as best illustrated in FIG. 3, comprise a pair of lateral side elements 26. In some embodiments, the side elements 26 may be separable from each other but secured together via horizontally-oriented fasteners. The lower portion 22 may, as shown in FIG. 2, have a funnel-type shape that extends downward to define a seed outlet 28, which may be in the form of an opening or a portal through which seed may pass to exit the housing 12.

Figure 4:
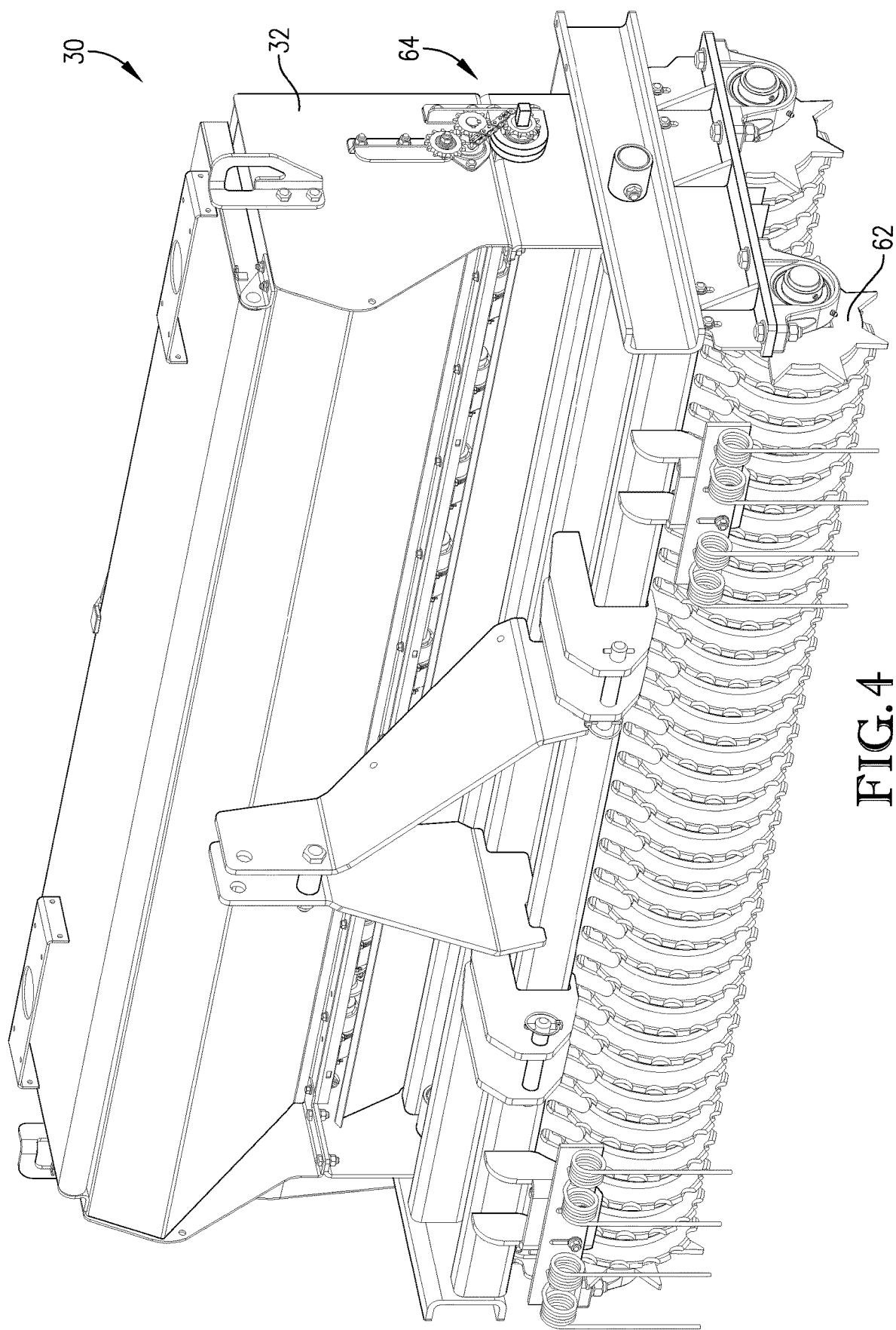
FIG. 4 is a rear, side perspective view of a seed planting machine according to embodiments of the present invention.
Figure 5:
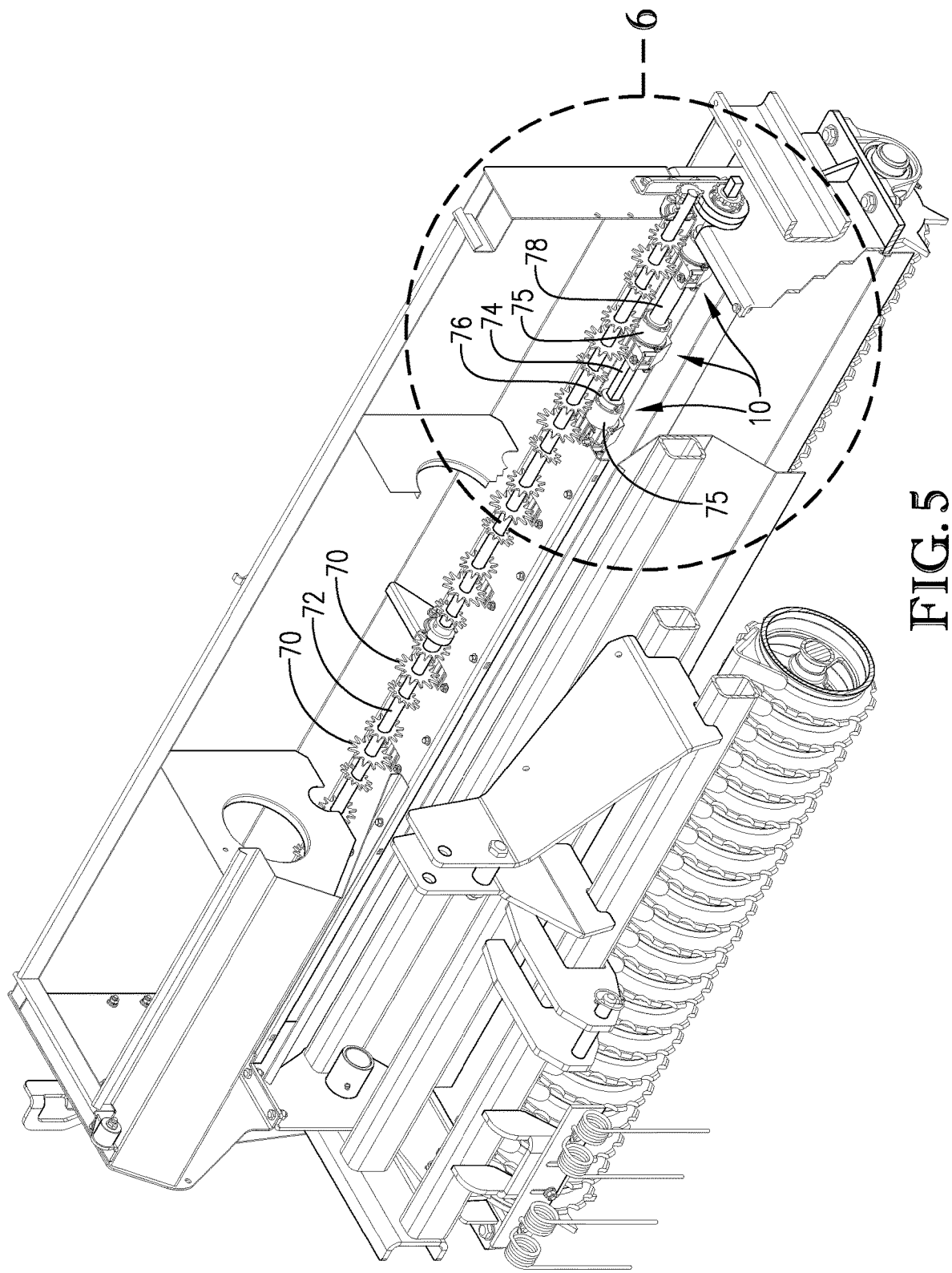
FIG. 5 is a top, side perspective view of the seed planting machine of FIG. 4, with a portion of the seed planting machine cutaway to illustrate a plurality of the seed meters from FIGS. 1-3.
Figure 6:
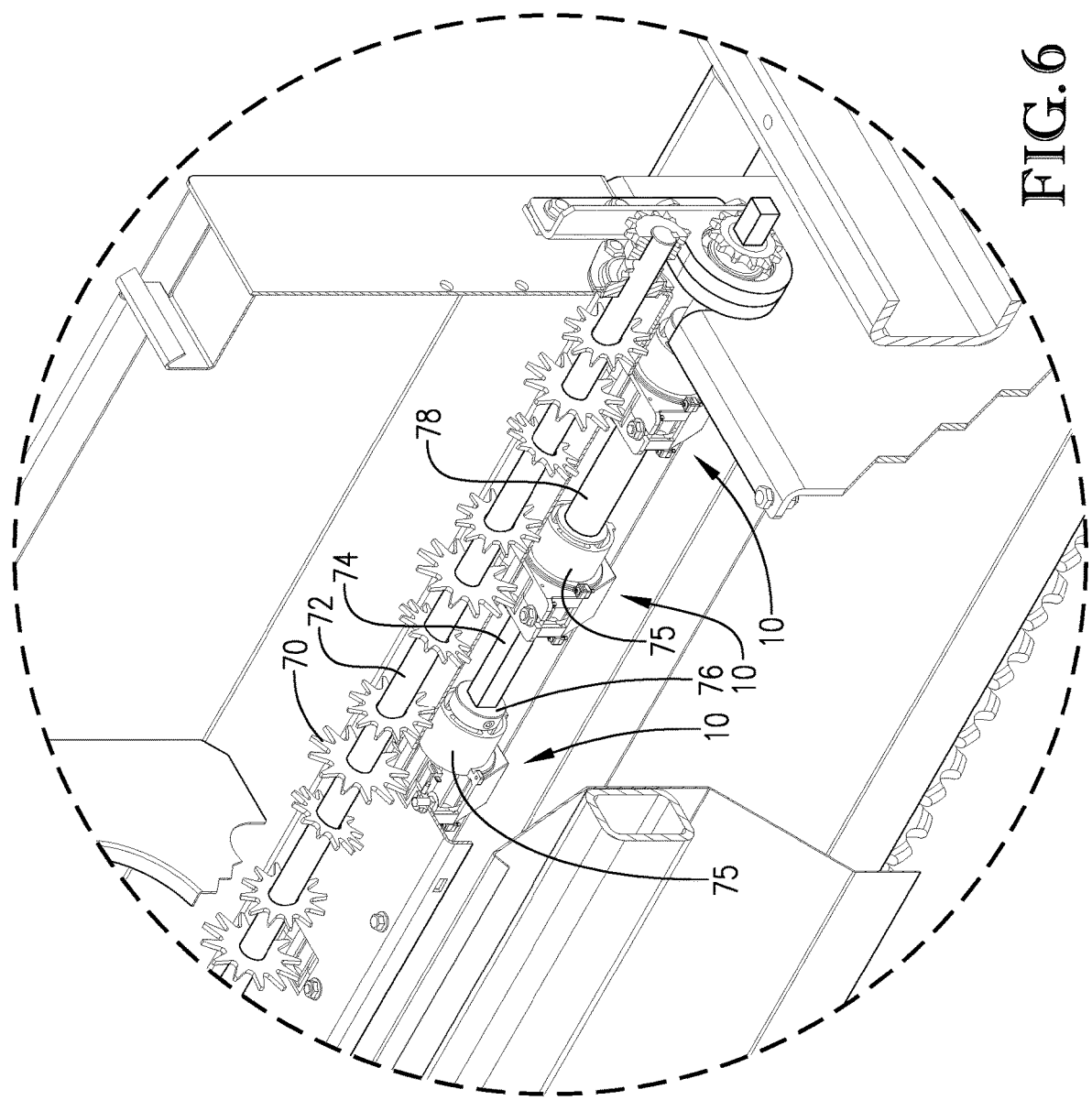
FIG. 6 is an enlarged view of a portion of the seed planting machine from FIGS. 4-5, particularly illustrating the portion circled in dashed line in FIG. 5.

As will be described in more detail below, one or more seed meters 10 may be used on a seed planting machine to facilitate the precise volumetric dispensing of seed from the seed planting machine, such that a precise amount of seed can be deposited in the ground over which the seed planting machine is traveling. FIG. 4 illustrates an exemplary seed planting machine 30 that may use the seed meters 10 of embodiments of the present invention. FIGS. 5 and 6 illustrate a plurality of such seed meters 10 incorporated in the seed planting machine 30.

Figure 7:
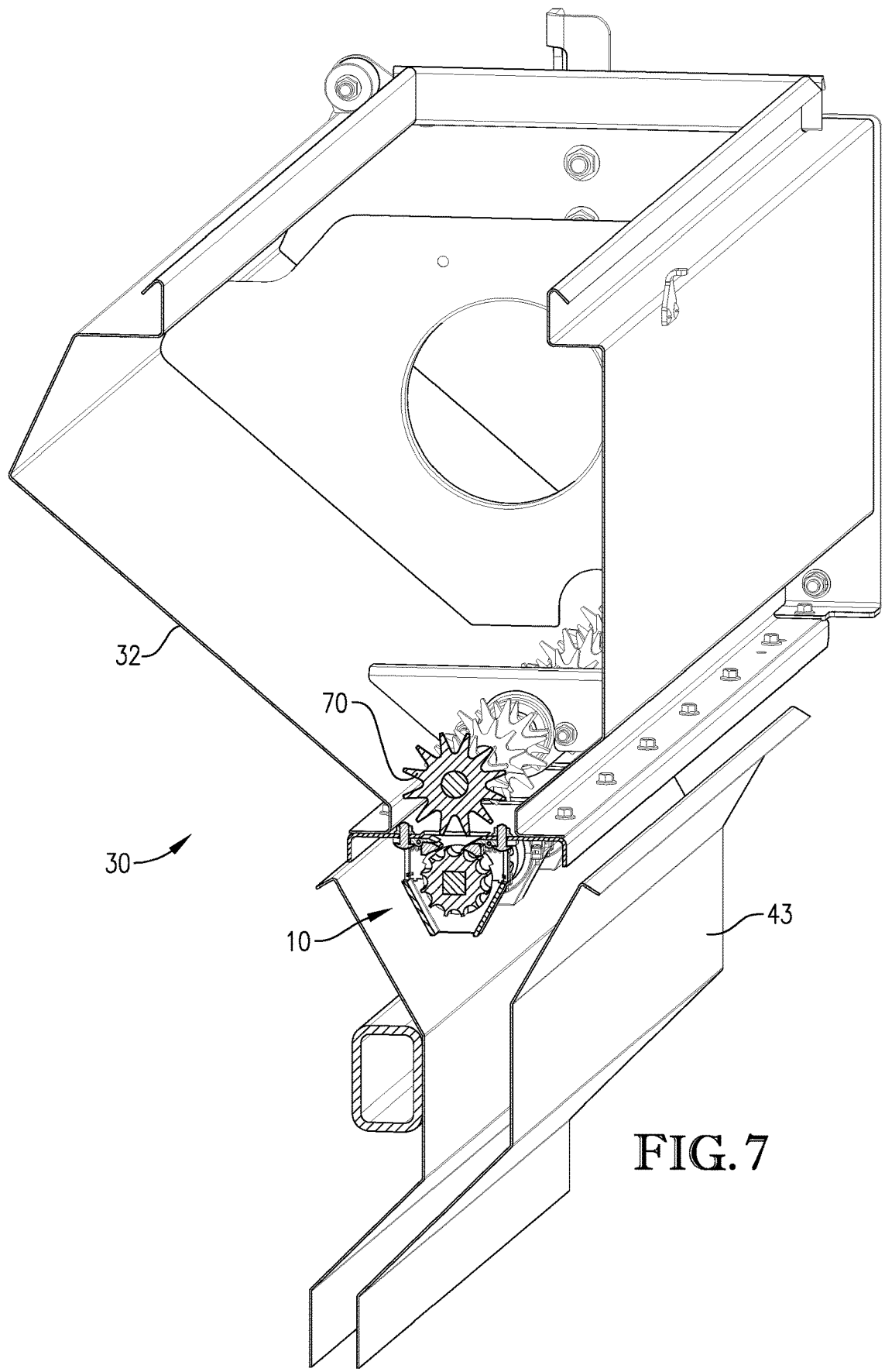
FIG. 7 is a perspective cross sectional view of a portion of the seed planting machine from FIGS. 4-6, particularly illustrating a seed bin, a seed meter secured to a bottom of the seed bin, and a seed channel positioned below the seed meter.
Figure 8:
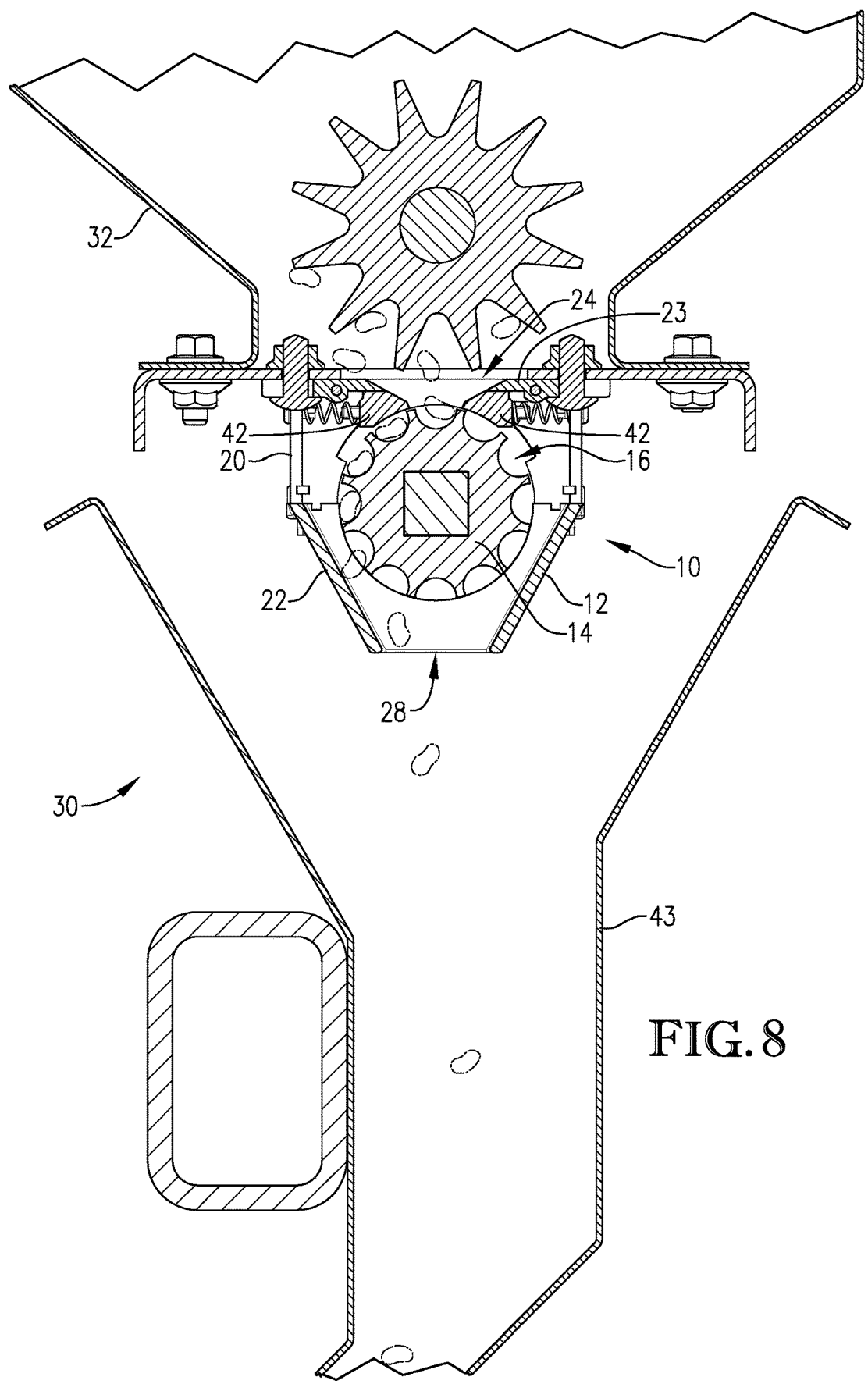
FIG. 8 is an elevation view of the cross section from FIG. 7, particularly illustrating the seed meter metering seed from the seed bin, and with the seed meter including a pair of seed guards each configured in a normal operating configuration.

As shown in FIGS. 7 and 8, each seed meter 10 can be secured (e.g., via one or more vertically-extending fasteners) to a bottom portion of a seed bin 32 of the seed planting machine 30. In general operation of the seed planting machine 30, the seed bin 32 will be filled with seed that is to be dispensed from the seed planting machine 30. With reference to FIG. 8, as the seed planting machine 30 (not shown in FIG. 8) travels over the ground, the metering wheel 14 of a seed meter 10 is caused to rotate within its housing 12. During such rotation, which may be either clockwise or counterclockwise, seed will enter the housing 12 through the seed inlet 24 under the force of gravity. The upper portion 20 of the seed meter 10 will direct seed to the metering wheel 14, such that a volumetric amount of seed will be captured within individual fluted sections 16 of the metering wheel 14 as the metering wheel 14 rotates. Certain embodiments may provide for the fluted sections 16 to be sized sufficiently (i.e., have an appropriate depth) such that, as the metering wheel 14 rotates, the seed captured within the fluted sections 16 will be positioned completely (or nearly completely) down within the fluted sections 16. As a result, the metering wheel 14 is capable of rotating, and carrying seed, unrestricted past the top surface 23 of the upper section 20 of the housing 12. In some embodiments, as will be described in more detail below, the seed meters 10 may comprise retractable seed guards 42 positioned under the top surface 23 of the upper section 20 of the housing 12. In such embodiments, each seed meter 10 may be configured such that the metering wheel 14 is capable of rotating, and carrying seed, unrestricted past the seed guards 42. As such, the metering wheel 14 can continue to rotate and carry the seed around in an arcuate manner until the seed is dropped from the metering wheel 14 under the force of gravity to fall out of the housing 12 via the seed outlet 28 presented by the lower portion 22 of the housing 12. As illustrated in FIGS. 7 and 8, the seed planting machine 30 may include a seed channel 43 for directing the seed from the seed meter 10 out of the seed planting machine 30 onto and/or into the ground. In some embodiments, the seed planting machine 30 may include individual seed planting units (not shown in the drawings) at a lower end of the seed channel 43 for injecting seed onto and/or into the ground.

During operation of seed planting machines, such as seed planting machine 30, it is not uncommon for large obstacles, such as rocks or other debris, to be present in the seed bin 32 that feeds the seed meters 10. An exemplary large obstacle, in the form of a rock, is illustrated within the seed bin 32 of FIG. 9, which is feeding seed into the seed meter 10. Large obstacles entering previously-used seed meters were problematic, because such large obstacles were known to cause damage to such seed meters (by physically damaging components of the seed meters, e.g., such as the metering wheel) and/or by jamming or otherwise interrupting the operation of the seed meters. However, the seed meter 10 of embodiments of the present invention overcomes such problems through the use of retractable seed guards 42, as illustrated in FIGS. 3, 8-12.

In more detail, each seed meter 10 may include a pair of seed guards 42 positioned within the housing 12. As perhaps best illustrated in FIG. 12, the seed meters 10 may include a seed guard 42 in each of a front portion and a rear portion of the interior space of the housing 12. As used herein, the directional term "front" or "forward" is illustrated by a leftward direction in FIGS. 8-12. Correspondingly, the directional term "rear," "back," or "rearward" is illustrated by the rightward direction in FIGS. 8-12.

Figure 12:
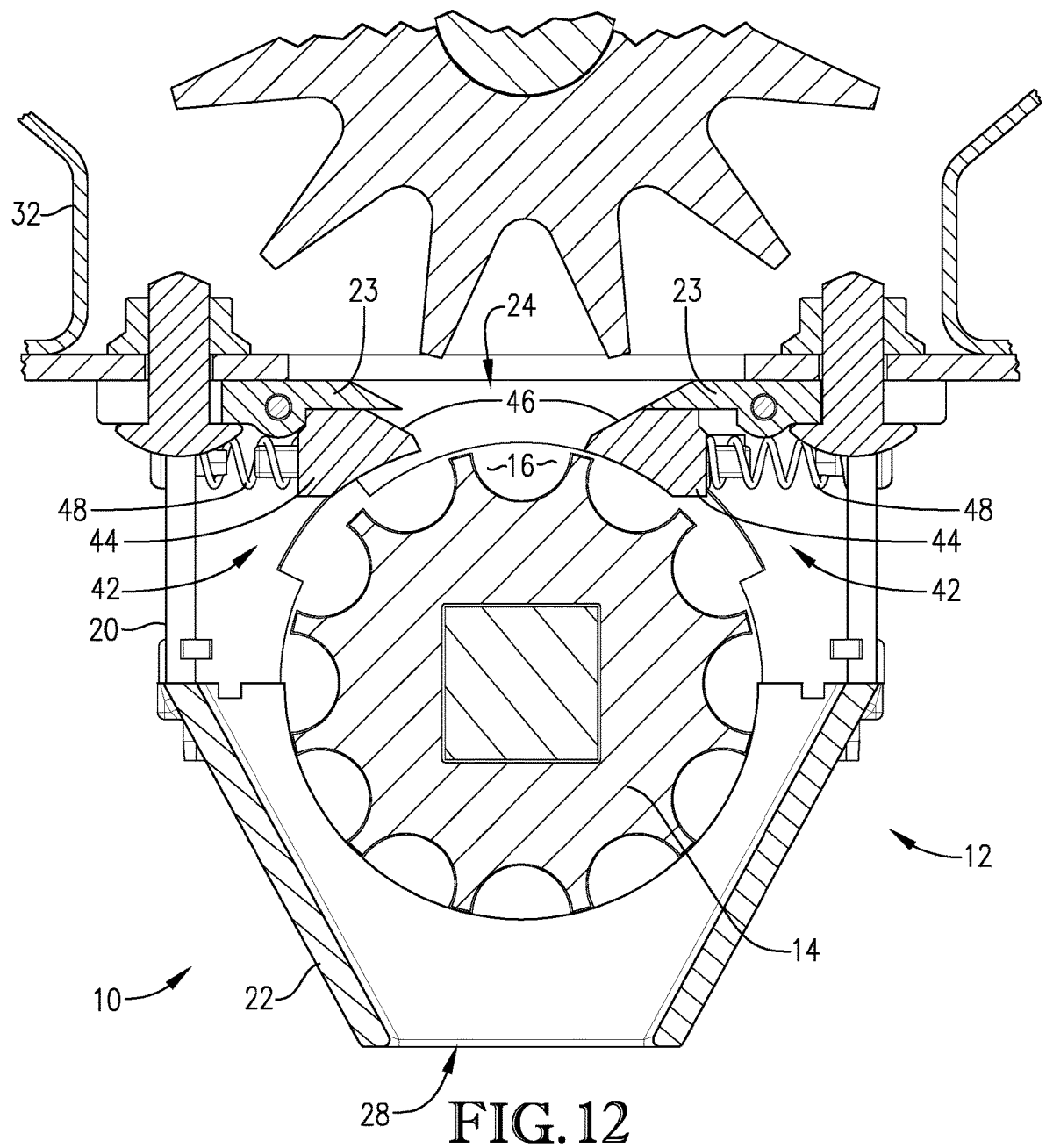
FIG. 12 is an enlarged cross section of the seed meter of FIGS. 1-3 and 7-11 attached to the bottom of the seed bin, with a front seed guard configured in a retracted configuration and a rear seed guard configured in a normal operating configuration.

As shown in FIGS. 3 and 12, the seed guards 42 may each comprise a rectangular base section 44 and a tip section 46. The tip section 46 may continuously reduce its cross-sectional width from the base section 44 to a narrow distal end of the tip section 46. In some embodiments, a bottom surface of the tip section 46 may have an arcuate curvature that generally corresponds with (or is at least nominally larger than) the curvature of the metering wheel 14. As such, the metering wheel 14 can rotate with the seed guards 42 being positioned very closely above the metering wheel 14. In general, as shown in FIG. 12, the seed guards 42 may be positioned within the interior space of the housing 12 adjacent to the top surface 23 of the upper portion 20 of the housing 12. A first of the seed guards 42 may be positioned towards a forward side of the housing 12 of the seed meter 10, while a second of the seed guards 42 may be positioned towards a rearward side of the housing 12 of the seed meter 10.

With reference to FIG. 3, each of the seed guards 42 may have a laterally-extending length that generally corresponds with the internal lateral width through the housing's 12 interior space. As such, each of the seed guards 42 can extend between the lateral side elements 26 of the upper portion 20 of the housing 12. The seed guards 42 may be held in position, at least partly, via engagement between the interior sides of the lateral side elements 26 of the upper portion 20 of the housing 12. Although the lateral side elements 26 can function to generally restrict lateral movement of the seed guards 42, embodiments provide for the seed guards 42 to shift forward and rearward (between a normal operating configuration shown by the right seed guard 42 of FIG. 12 and a retracted configuration shown by the left seed guard 42 of FIG. 12) within the seed meter 10. Such shifting provides for the seed guards 42 to selectively (1) prevent or restrict excess seed from flowing through the seed meter 10 and (2) enlarge the seed inlet 24 and/or the spacing between the seed guards 42 and the metering wheel 14 to permit passage of large obstacles through the seed meter 10, as will be described in more detail below. Each of the seed guards 42 may be secured to the upper portion 20 of the housing 12 via one or more spring elements 48, which are illustrated in FIGS. 3 and 12. A first of the seed guards 42 may be secured to a front side of the upper portion 20 of the housing 12 via a pair of a spring elements 48 that extend between the front side of the upper portion 20 and the base section 44 of the first seed guard 42. Similarly, a second of the seed guards 42 may be secured to a rear side of the upper portion 20 of the housing 12 via a pair of a spring elements 48 that extend between the rear side of the upper portion 20 and the base section 44 of the second seed guard 42.

Figure 9:
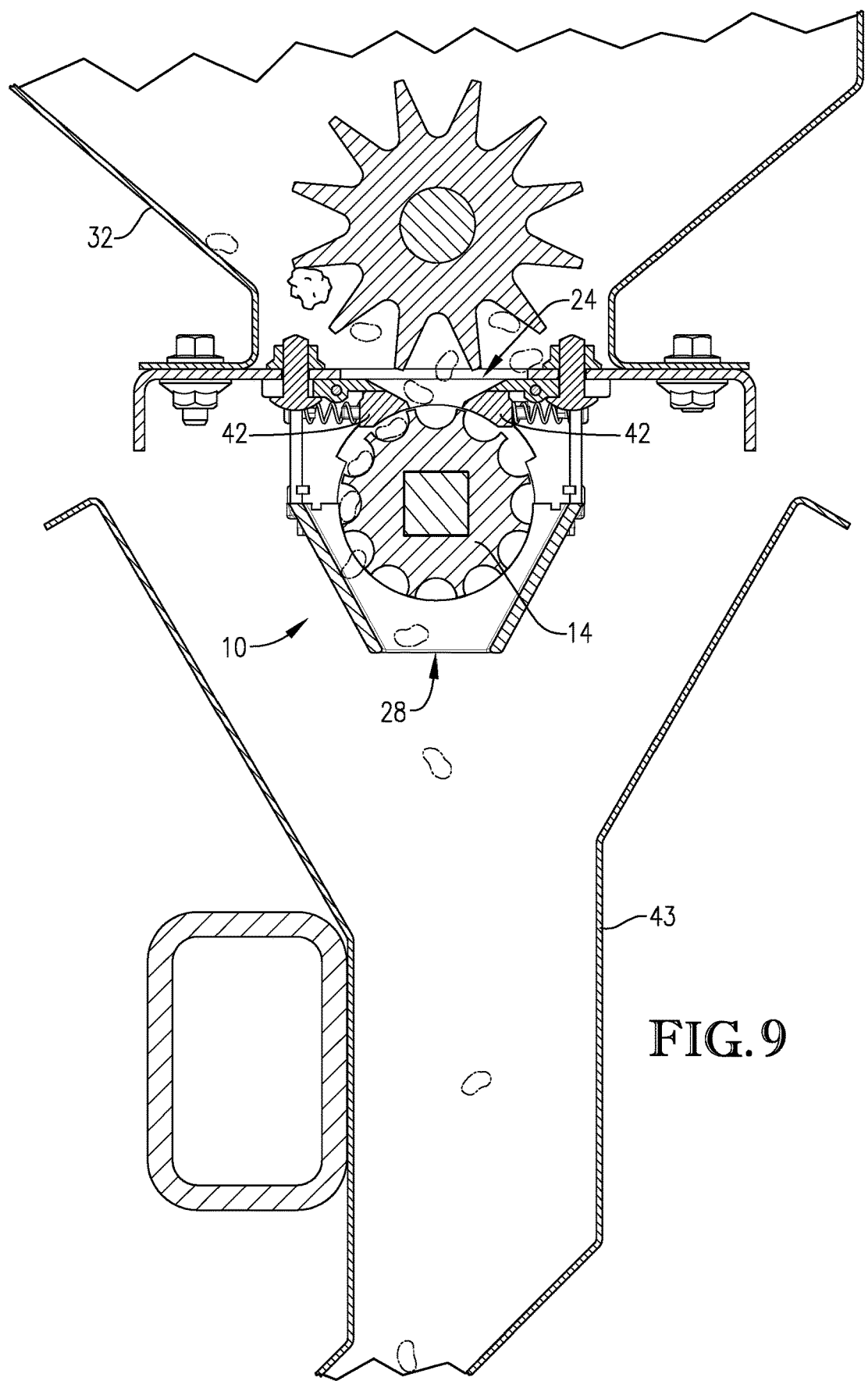
FIG. 9 is another elevation view of the cross section of FIGS. 7 and 8, particularly illustrating the seed bin containing a large obstacle.

In the normal operating configuration, as illustrated in FIGS. 8 and 9, at least a portion of the seed guards 42 extend underneath the seed inlet 24 so as to at least partially block the seed inlet 24. For instance, in the normal operating configuration (as illustrated by the rearward seed guard 42 of FIG. 12), a portion of the tip sections 46 of the seed guards 42 may extend underneath the seed inlet 24. As such, the seed guards 42 function to restrict the opening presented by the seed inlet so as to direct seed to the metering wheel 14 by funneling the seed into the fluted sections 16. In such an operating configuration, the seed guards 42 also prevent an overflow of seed from falling freely through the seed meter 10 (e.g., through the interior space presented between the metering wheel 14 and the housing 12). Instead, the seed guards 42 direct seed directly into the fluted section 16 of the metering wheel 14, such that the metering wheel 14 can carry a precise volumetric amount of seed (as defined by the size of the fluted sections 16) around in an arcuate manner to be dropped out and exit the seed meter 10 via the seed outlet 28. As such, the seed meter 10 of embodiments of the present invention is configured to meter specific and precise amounts of seed from the seed bin 32, through the seed channel 43, and onto and/or into the ground over which the seed planting machine 30 travels.

Figure 10:
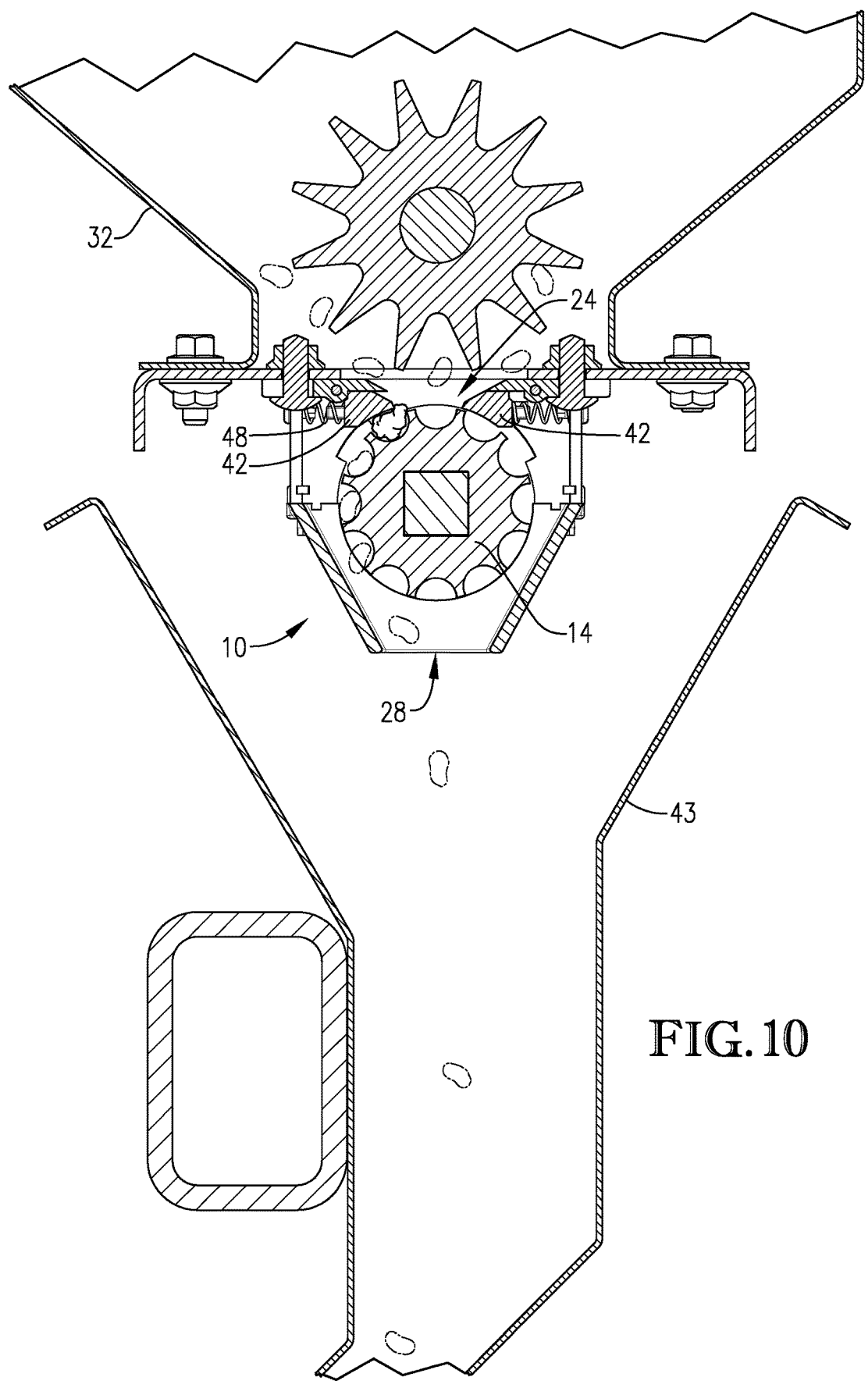
FIG. 10 is another elevation view of the cross section of FIGS. 7-9, particularly illustrating the large obstacle entering the seed meter, and with one of the seed guards being shifted to a retracted configuration.

Some embodiments additionally provide, however, for the seed guards 42 to be shifted to a retracted configuration, as illustrated by the forward seed guard in FIGS. 10 and 12, in which the seed guards 42 are actuated against the force of their springs 48. In such a retracted configuration, a portion of the seed guards 42 that extended underneath the seed inlet 24 in the normal operating configuration (e.g., including a portion of the tip sections 46 of the seed guards 42) may be shifted out from underneath the seed inlet 24 so as to clear the seed inlet 24 or to otherwise enlarge the effective flow-through area of the seed inlet 24. Such retraction of the seed guards 42 also provides for an increase in spacing between the metering wheel 14 and the seed guards 42. As such, with the seed guards 42 in the retracted configuration, large obstacles, including rocks and other debris, are permitted to pass from the seed bin 32 and through the seed meter 10 without damaging or jamming the seed meter 10, as will be discussed in more detail below.

In some embodiments, to ensure sufficient securement of the seed guards 42 within the housing 12, as well as to facilitate shifting of the seed guards 42 between the normal operating configuration and the retracted configuration, the lateral side elements 26 of the upper portion 20 of the housing 12 may each include linear groove elements 50, as illustrated in FIG. 3, for engaging with the sides of the seed guards 42. A pair of groove elements 50 on one lateral side element 26 is illustrated in FIG. 3. It is understood that the other lateral side element 26 also includes corresponding groove elements 50 on its interior side. In such embodiments, each of the seed guards 42 may also include linear protrusions or tabs 52 on each of its lateral sides, which are configured to fit within the groove elements 50. With the linear protrusions or tabs 52 engaged within the groove elements 50, the seed guards 42 can shift forward and rearward along the groove elements 50. In certain embodiments, the groove elements 50 may be sized and positioned to ensure that the seed guards 42 at least partially block the seed inlet 24 when in the normal operating configuration. In addition, the length of the groove elements 50 may be sized so as to permit the seed guards 42 to shift away from the seed inlet 24 to the retracted configuration such that the seed guards are clear of the seed inlet 24 to permit large obstacles to pass.

The general operation of the seed meter 10 and its seed guards 42 will now be described in more detail. As was discussed previously, FIG. 8 illustrates a seed meter 10 attached to a seed bin 32 and metering seed from the seed bin 32. During such metering, the metering wheel 14 is shown rotating counter-clockwise. Nevertheless, it should be understood that the seed meter 10 can similarly meter seed with the metering wheel 14 rotating clockwise. As shown, the seed guards 42 are in their normal operating configuration, in which at least a portion of the seed guards 42 are positioned directly below a portion of the seed inlet 24. In such a configuration, seeds are directed down through the seed inlet 24 and into the fluted sections 16 of the metering wheel 14. Seeds are not, however, capable of freely flowing through the interior space of the housing 12 (e.g., between the metering wheel 14 and the housing 12) because the seed guards 42 direct the seed into the fluted sections 16 and prevent the seed from flowing past the metering wheel 14 without being received in one of the fluted sections 16. With seed received in the fluted sections 16, the metering wheel 14 will carry the seed (i.e., via rotation) past the seed guard 42 and the top surface 23 of the upper portion 20 of the housing 12. After further rotation of the metering wheel 14, the seed will be dropped out of the seed meter 10 via the seed outlet 28 down through the seed channel 43 and onto and/or into the ground. As such, the seed meter 10 is configured to meter specific and precise amounts of seed from the seed planting machine 30.

Figure 11:
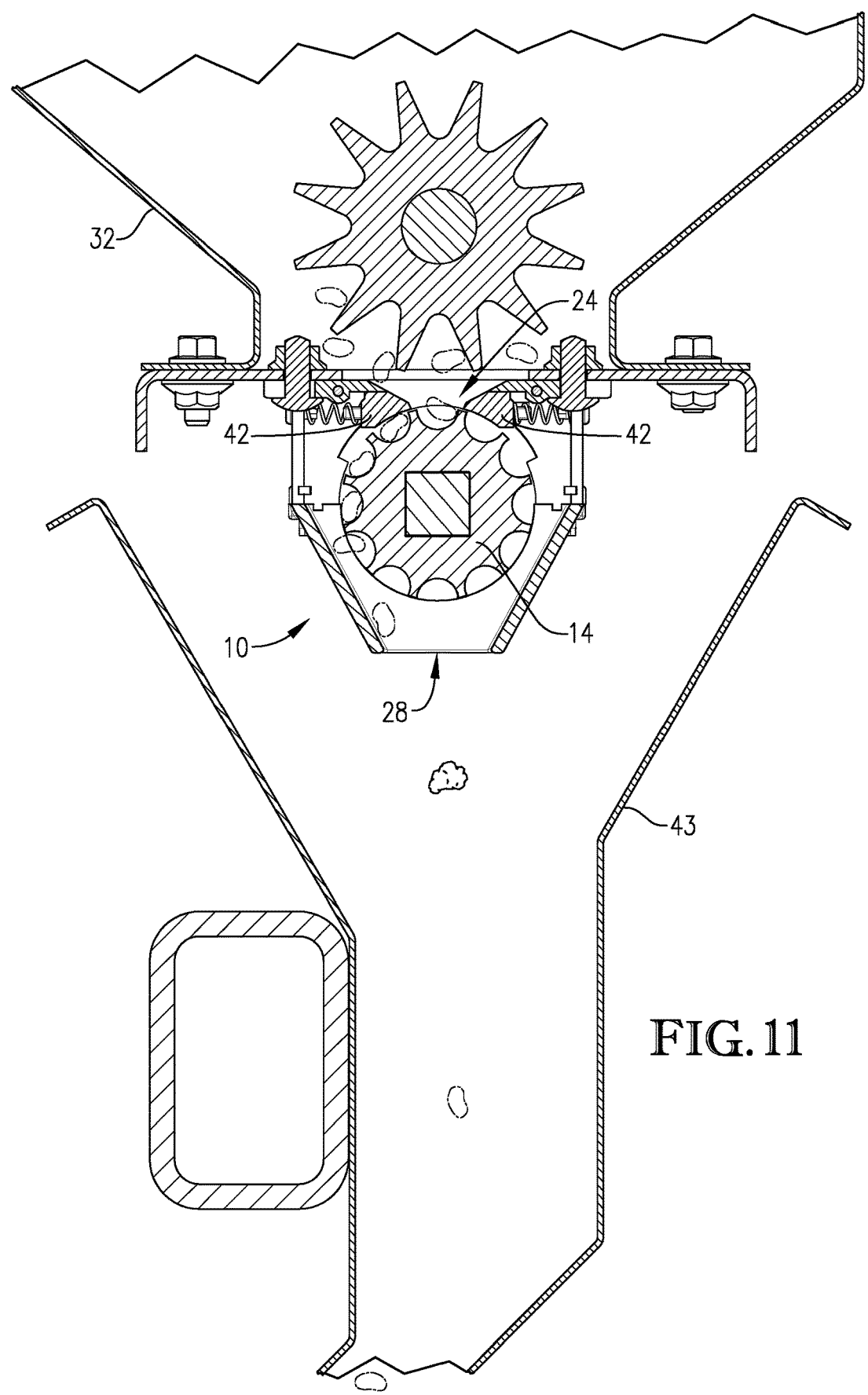
FIG. 11 is another elevation view of the cross section of FIGS. 7-10, particularly illustrating the large obstacle exiting the seed meter.

Should the seed meter 10 encounter a large obstacle, such as the rock shown in FIGS. 9-11, embodiments of the present invention provide for the large obstacle to be passed through the seed meter 10 without causing damage to the seed meter 10 or interrupting operation of the seed meter 10 (e.g., jamming the seed meter 10). In more detail, as shown in FIG. 10, as the large obstacle drops down through the seed inlet 24, the large obstacle will become engaged with the metering wheel 14 as the metering wheel 14 rotates. Beneficially, upon the large obstacle encountering the seed guard 42, the large obstacle (under force from the metering wheel 14) will force the seed guard 42 to be shifted against the springs 48 to the retracted configuration. With the seed guard 42 in the retracted configuration, the large obstacle will be free to pass below the seed guard 42 and the top surface 23 of the upper portion 20 of the housing 12. Continued rotation of the metering wheel 14 will assist the large obstacle to be carried around the interior space of the metering wheel 14, such that the large obstacle will be dropped out of the seed meter 10 via the seed outlet 28, as shown in FIG. 11.

As was described previously, the seed meter 10 of embodiments of the present invention is configured to operate with the metering wheel 14 rotating in either direction (e.g., clockwise or counter-clockwise). Beneficially, with the seed meter 10 including seed guards 42 on both its front side and its rear side, the seed guards 42 will permit both seed and large obstacles to pass through the seed meter 10 when the metering wheel 14 is rotating in either the clockwise or counter-clockwise direction. As such, the seed meter 10 is configured to meter specific and precise amounts of seed from the seed planting machine 30 regardless of the direction in which the metering wheel 14 is rotating. Furthermore, the seed meter 10 can permit large obstacles to pass without damaging or interrupting operation of the seed meter 10, regardless of the direction in which the metering wheel 14 is rotating.

Operation of the seed meters 10 will now be described more broadly with respect to operation of a seed planting machine 30, as illustrated in FIGS. 4-6. As previously described above, the seed planting machine 30 is generally configured to dispense seed onto and/or into the ground over which the seed planting machine 30 travels. Beneficially, because of the configuration of the seed meters 10 included within the seed planting machine 30, the seed planting machine 30 can dispense seed onto and/or into the ground regardless of the direction in which the seed planting machine 30 is travelling. In addition, the seed planting machine 30 is capable of passing large obstacles that may be present within its seed bin 32 through the seed meters 10 without damaging or interrupting operation of the seed meters 10 regardless of the direction in which the seed planting machine 30 is travelling.

In more detail and with reference to FIG. 4, embodiments of the present invention include a seed planting machine 30 broadly comprising the seed bin 32 for housing seed, a ground-engaging roller mechanism 62, a transmission assembly in the form of a rotation distribution assembly 64 for imparting rotation from the ground-engaging roller mechanism 62 to components of the seed planting machine 30, such as to the seed meters 10. The rotation distribution assembly 64 may include one or more axles, as well as a plurality of sprockets, pulleys, gears, or other rotational mechanisms linked by chains, belts, or the like. As such, the rotation distribution assembly 64 is capable of transmitting rotation from the ground-engaging mechanism 62 to a plurality of components of the seed planting machine 30.

In certain embodiments, as shown in FIG. 4, the seed planting machine 30 will include only a single seed bin 32 for housing seed. However, the seed planting machine 30 may include more than one seed bin 32. As illustrated by FIGS. 5 and 6, the seed bin 32 may be associated with one or more mixing/stirring components 70, which may comprise gear-shaped mixing wheels, paddle wheels, auger agitators, mixing arms, or other similar mixing components. The mixing/stirring components 70 may be positioned along a generally elongated shaft 72, which may form part of the rotation distribution assembly 64. As such, rotation of the rotation distribution assembly 64, and thus the elongated shaft 72, will cause a corresponding rotation of the mixing/stirring components 70. In operation, the mixing/stirring components 70 are operable to be rotated within the seed bin 32, such that the mixing/stirring components 70 continually mixes the seed within the seed bin 32, thereby keeping the seed from clumping together (i.e., coagulating), keeping the seed from bridging within the seed bin 32, and generally keeping a consistent flow of seed to the seed meters 10.

Embodiments of the present invention provide for one or more seed meters 10 to be secured to a bottom portion of the seed bin 32. Specifically, as illustrated in FIGS. 5 and 6, the seed planting machine 30 may include a plurality of seed meters 10 spaced along the length of and secured to the bottom of the seed bin 32. The seed meters 10 may be positioned along a generally elongated shaft 74, which may form part of the rotation distribution assembly 64. Specifically, the elongated shaft 74 may extend through each of the metering wheels 14 of the seed meters 10. As such, rotation of the rotation distribution assembly 64, and thus the elongated shaft 74, will cause a corresponding rotation of the metering wheels 14 within the seed meters 10. As perhaps best shown in FIG. 6, the metering wheels 14 may each be associated with one or more smooth-surfaced drums 75 and/or one or more locking elements 76 positioned on either side (or both sides) of the seed meters 10. In some embodiments, each group of metering wheel 14, drum 75, and locking element 76 may be integrally formed together, such that the group of elements can rotate together. In more detail, the locking element 76 may include a set screw that engages with the elongated shaft 74, such that the locking element 76, as well as the integrated metering wheel 14 and drum 75, can rotate in conjunction with the elongated shaft 74. In addition, the locking element 76 can function to inhibit the metering wheel 14 and/or the drum 75 from shifting laterally along the elongated shaft 74. With the set screw of the locking element 76 engaged with the elongated shaft 74, a lateral shifting of the elongated shaft 74 can cause a corresponding lateral shifting of the metering wheel 14 and/or drum 75. In addition, the seed meters 10 may be associated with a spacing element 78 positioned between certain of the seed meters 10 for inhibiting relative lateral shifting and maintaining spacing between metering wheels 14.

In operation, the metering wheels 14 are operable to be rotated so as to capture seed falling into the housing 12 from the seed bin 32. As the metering wheels 14 continue to rotate, the captured seeds are carried along until the seeds are dropped from the metering wheels 14 to fall out of the housing 12 and into the seed channel 43 to be planted or otherwise dispensed onto and/or into the ground. The rate at which seeds are dispensed is, at least partly, based on the speed at which the metering wheels 14 are rotated. In addition, and as will be discussed in more detail below, each of the metering wheels 14 may be laterally shifted, at least partially, to a position outside of the housing 12 so as to be capable of capturing fewer seeds from the seed bin 32. As such, the rate at which seeds are dispensed from the seed meters 10 can be, at least partly, based on the lateral position of the metering wheels 14 with respect to their respective seed meter 10 housing 12.

To provide rotational power to the seed meters 10, embodiments of the present invention provide for the ground-engaging mechanism 62 to provide rotational power to the rotation distribution assembly 64. The ground-engaging mechanism 62 may comprise various types of rolling mechanisms, such as a row of aerators, a row of disc harrows/tillers, an extended spiked roller, a packer roller, or the like. In other embodiments, the ground-engaging mechanism 62 may simply include one or more of the wheels of the seed planting machine 30. In some embodiments, such as illustrated in FIG. 4, the ground-engaging mechanism 62 will be positioned at a rear of the seed planting machine 30. In other embodiments, the ground-engaging mechanism 62 may be positioned at front, or at a position between the front and rear, of the seed planting machine 30. Nevertheless, the ground-engaging mechanism 62 can be connected to the rotation distribution assembly 64 (e.g., via chains, belts, or the like), such that rotation of the ground-engaging mechanism 62 will cause a corresponding rotation of components of the rotation distribution assembly 64. Further, rotation of the rotation distribution assembly 64 will cause a corresponding rotation of the metering wheels 14 within the seed meters 10 (e.g., via rotation of the elongated shaft 74). As such, the seed meters 10 are configured to dispense seed as the seed planting machine 30 travels over the ground. The rate at which seeds are dispensed from the seed planting machine 30 can be based on the speed at which the seed planting machine 30 is travelling over the ground.

Figure 13A:
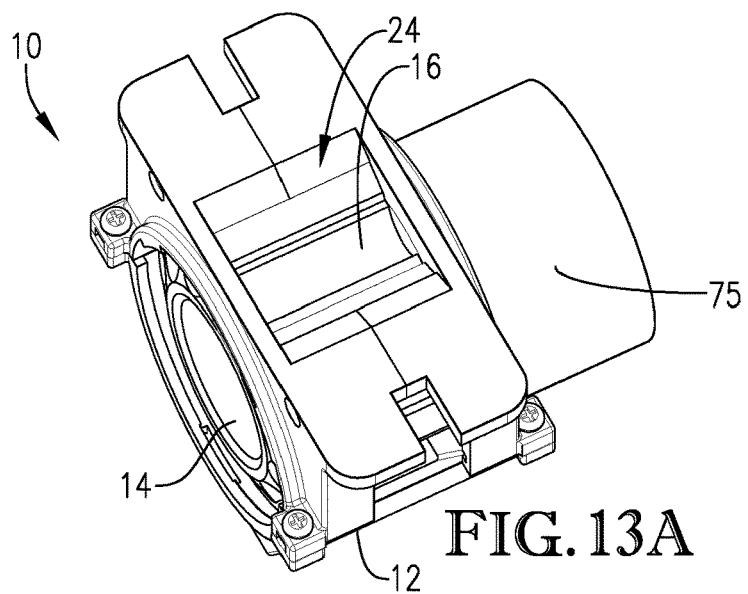
FIG. 13A is top perspective view of a seed meter according to embodiments of the present invention, illustrating a metering wheel positioned completely within a housing of the seed meter.
Figure 13B:
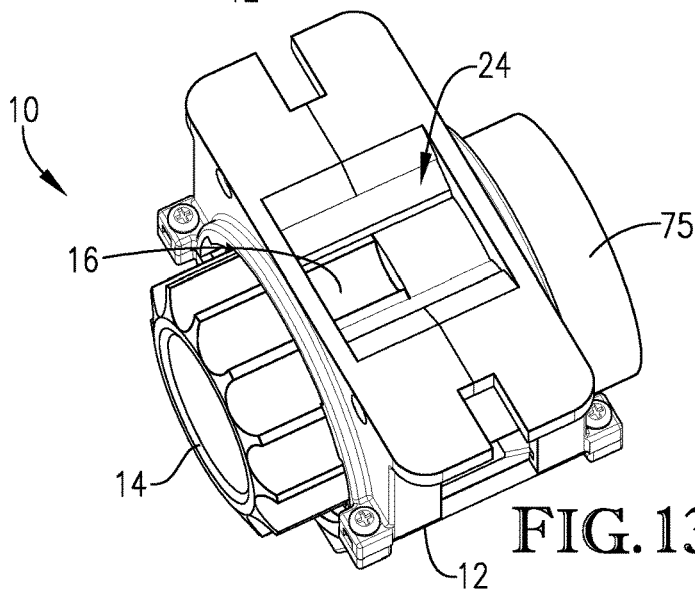
FIG. 13B is a top perspective view of the seed meter of FIG. 13A, illustrating the metering wheel partly positioned within the housing.

In addition, the rate at which seed can be dispensed from the machine 30 can also be based on the extent to which each metering wheel 14 is positioned within the housings 12. For example, if a metering wheel 14 is positioned entirely within the housing 12, as illustrated in FIG. 13A, the metering wheel 14 will be configured to fully accept seed from the seed been 32. Specifically, with the metering wheel 14 completely positioned within the housing 12, the entirety of the fluted sections 16 of the metering wheel 14 are available to capture seeds passing through the seed inlet 24 from the seed bin. In contrast, in some embodiments, the metering wheel 14 can be at least partially shifted outside of the housing 12. For example, as illustrated in FIG. 13B, the metering wheel 14 can be laterally shifted such that a first portion of the metering wheel 14 (e.g., approximately one-half of the metering wheel 14) is positioned outside of the housing 12, while a second portion of the metering wheel 14 remains positioned within the housing 12. As shown, a portion of the smooth-surfaced drum 75, which is integrated with the metering wheel 14, is laterally shifted along with the metering wheel 14 such that a portion of the drum 74 is positioned within the interior space of the housing 12.

Figure 13C:
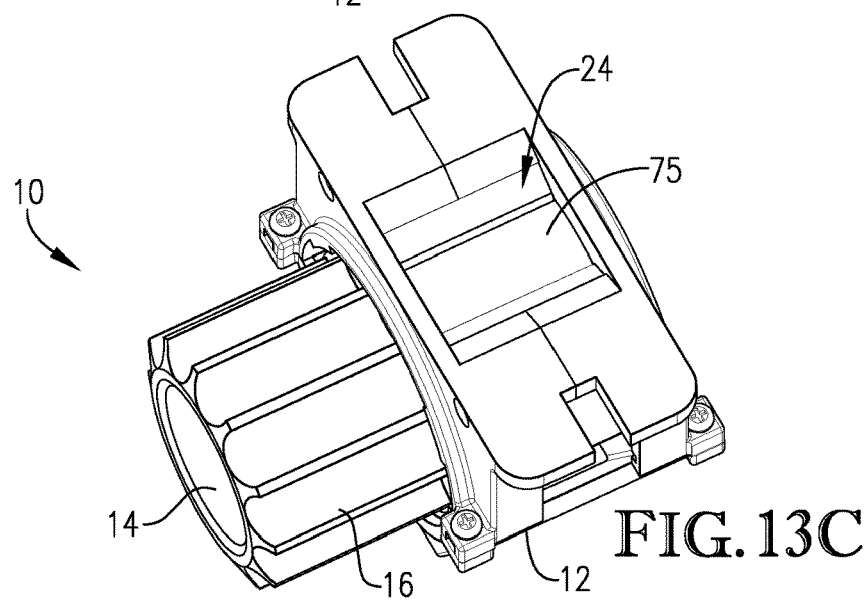
FIG. 13C is a top perspective view of the seed meter of FIGS. 13A and 13B, illustrating the metering wheel positioned completely outside the housing.

It should be understood that such a lateral shifting can be accomplished by laterally shifting the elongated shaft 74 to which the metering wheel 14 and/or the drum 75 is secured. In such a configuration (i.e., with only a portion of the metering wheel 14 positioned within the housing 12), only a portion of the fluted sections 16 are available to capture seed passing through the seed inlet 24 from the seed bin 32. It is noted that the smooth outer surface of the drum 75 does not facilitate the capturing of seed. As such, the metering wheel 14 illustrated in FIG. 13B is configured to dispense seed at a slower rate than the metering wheel 14 illustrated in FIG. 13A (assuming an equivalent rotational speed). Finally, as illustrated in FIG. 13C, the metering wheel 14 can be laterally shifted (i.e., via shifting of the elongated shaft 74) further, such that the metering wheel 14 is entirely outside of the housing 12. The drum 75 is shifted along with the metering wheel 14, such that the drum 75 is positioned completely inside of the housing 12. In such a configuration, the seed meter 14 will not dispense seed, as there is no portion of metering wheel 14 fluted sections 16 available to capture seed. Instead, the smooth-surfaced drum 75 simply rotates within the housing 12, not capturing seed from the seed bin 32 or dispensing seed from the seed meter 10.

The embodiments shown in FIGS. 13A-13C provide an ability to control the rate at which seed is deposited from the seed planting machine 30. With the metering wheels 14 positioned entirely within the housings 12 (i.e., FIG. 13A), the seed meters 10 are configured to dispense a maximum amount of seed at any given rate of rotation of the metering wheels 14. Laterally shifting the metering wheels 14 outside of the housings 12 provides for the dispensing rate to be reduced. The rate of dispensing seed can be reduced in a generally linear manner until the metering wheels 14 are positioned entirely outside of the housings 14, at which time the seed planting machine 30 is stopped from planting seed. As such, the above-described embodiments are configured to act as a clutch for the seed planting machine 30. For instance, as the seed planting machine 30 is travelling over the ground, the seed meters 14 can be at least partially positioned within the housings 12 (e.g., FIG. 13A or 13B), such that the seed meters 10 can deposit seed onto and/or into the ground. Should the seed planting machine 30 encounter a section of the ground that does not require seed to be deposited, the metering wheels 14 can be laterally shifted, via lateral shifting of the elongated shaft 74, to a position entirely outside of the housings 12 (i.e., FIG. 13C), such that the seed meters 10 stop depositing seed. It is noted that with the metering wheels 14 positioned outside of the housings 12, the seed meters 10 do not dispense seed even while the seed planting machine 30 continues to travel over the ground and the metering wheels 14 continue to rotate.

Beneficially, the seed meters 10 are configured to dispense seed regardless of the direction in which the seed planting machine 30 is travelling. As was described previously, the seed meters 10 are configured to dispense seed regardless of whether the metering wheels 14 rotated in a first direction (e.g., clockwise) or a second direction (e.g., counterclockwise). As such, with the seed planting machine 30 travelling in a first direction (e.g., forward), the seed meters 10 can dispense seed by having their metering wheels 14 rotate in a first direction (under power provided by the ground-engaging mechanism 62 and the rotation distribution assembly 64). Similarly, with the seed planting machine 30 travelling in a second direction (e.g., rearward or reverse), the seed meters 10 can also dispense seed by having their metering wheels 14 rotate in a second direction (under power provided by the ground-engaging mechanism 62 and the rotation distribution assembly 64). Thus, the seed meters 10 of embodiments of the present invention are configured to dispense seed regardless of the direction of travel of the seed planting machine 30.

In view of the above, embodiments of the present invention include a method for planting seed with a seed planting machine 30. The method can include a step of providing one or more seed meters 10 in association with a seed bin 32. The seed meters 10 each include a housing 12 that presents a seed inlet 24 and a seed outlet 28, and a metering wheel 14 positioned within the housing 12. In some embodiments, each of the seed meters 10 may additionally comprise a pair of retractable seed guards 42 configured to be selectively configured in an operating configuration and in a retracted configuration. The method includes the additional step of travelling in a first direction with the seed planting machine 30. During such travelling, the step further includes metering seed from the seed bin 32 via the metering wheel 14 rotating in a first direction. In additional embodiments, during such travelling step, the seed guards 42 may be configured in the operating configuration to prevent excess seed from passing through the seed meter 10. The method includes a further step of travelling in a second direction with the seed planting machine 30. During such travelling, the step further includes metering seed from the seed bin 32 via the metering wheel 14 rotating in a second direction. In some instances, a large obstacle may be present within the seed bin 32. In such instances, embodiments provide that during such travelling step, at least one of the seed guards 42 may be configured in the retracted configuration to allow the large obstacle to pass through the seed meter 10.

As such, embodiments provide for the metering of seed, in a precise and accurate manner, regardless of the direction in which the seed planting machine 30 is travelling. In addition, the seed meters 10 of embodiments of the present invention provide for large obstacles to pass through the seed meter 10 without damaging or interrupting operation of the seed meter 10.

Although the invention has been described with reference to the one or more embodiments illustrated in the figures, it is understood that equivalents may be employed and substitutions made herein without departing from the scope of the invention as recited in the claims.

What is claimed is:

1. A method for planting seed with a seed planting machine, the method comprising the steps of:
   (a) providing at least one seed meter in association with a seed bin, wherein the seed meter includes a housing that presents a seed inlet and a seed outlet, and a metering wheel positioned within the housing;
   (b) travelling in a first travel direction with the seed planting machine while seed is metered from the seed bin via the metering wheel rotating in a first metering wheel direction; and
   (c) travelling in a second travel direction opposite the first travel direction with the seed planting machine while seed is metered from the seed bin via the metering wheel rotating in a second metering wheel direction opposite the first metering wheel direction,
   wherein seed is planted by said seed planting machine during said traveling of both steps (b) and (c),
   wherein the seed meter further comprises a pair of retractable seed guards each configured to be selectively positioned in an operating configuration and in a retracted configuration, wherein during said travelling of step (b) the seed guards are positioned in the operating configurations to prevent excess seed from passing through the seed meter.

2. The method of claim 1, wherein said travelling of step (c) further includes the seed meter encountering an obstacle from the seed bin and retracting one of the seed guards from the operating configuration to the retracted configuration.

3. The method of claim 2, further including the step of passing the obstacle at least partly through the seed meter with the seed guard in the retracted configuration.

4. The method of claim 1, wherein the seed meter further comprises a spring associated with each seed guard, wherein the springs are configured to maintain the seed guards in the operating configurations, and wherein the springs are further configured to permit the seed guards to shift to the retracted configurations upon encountering obstacles.

5. The method of claim 4, wherein the seed guards each comprises a base section and a tip section, wherein in the operating configurations the tip sections of the seed guards extend at least partially under the seed inlet.

6. The method of claim 5, wherein in the retracted configurations the seed guards are retracted against respective springs such that at least a portion of the tip sections that extended underneath the seed inlet in the operating configurations do not extend under the seed inlet.

7. The method of claim 1, wherein during said travelling of step (b), the first travel direction of the seed planting machine is forward, and wherein during said travelling of step (c), the second travel direction of the seed planting machine is reverse.

8. The method of claim 7, wherein the seed planting machine further includes one or more ground-engaging mechanisms configured to provide rotation to the seed meter as the seed planting machine travels forward and reverse.

9. A seed planting machine for dispensing seed onto and/or into the ground, said seed planting machine comprising:
 a seed bin configured to hold seed; and
 at least one seed meter associated with said seed bin and configured to meter seed from said seed bin, wherein said seed meter comprises—
  a housing at least partially enclosing an interior space, wherein said housing presents a seed inlet and a seed outlet,
  a metering wheel positioned within the interior space of said housing, wherein rotation of said metering wheel provides for seed to travel through said seed meter from the seed inlet to the seed outlet,
  wherein said seed meter further comprise a pair of retractable seed guards positioned within the interior space of said housing and each configured to be selectively positioned in an operating configuration and in a retracted configuration, wherein in the operating configurations said seed guards are configured to prevent excess seed from passing through said seed meter, and wherein in the retracted configurations said seed guards are configured to permit obstacles to pass through said seed meter,
 wherein if said seed planting machine is travelling forward, said seed meter is configured to meter seed from said seed bin via said metering wheel rotating in a first direction, and wherein if said seed planting machine is travelling rearward, said seed meter is configured to meter seed from said seed bin via said metering wheel rotating in a second direction.

10. The seed planting machine of claim 9, wherein said pair of seed guards includes a first seed guard positioned within a front portion of the interior space of said housing, and wherein said pair of seed guards includes a second seed guard positioned within a rear portion of the interior space of said housing.

11. The seed planting machine of claim 9, wherein said seed meter further comprises a spring associated with each seed guard, wherein said springs are configured to maintain said seed guards in the operating configurations, and wherein said springs are further configured to permit said seed guards to shift to the retracted configurations upon encountering obstacles.

12. The seed planting machine of claim 9, wherein said housing comprises an upper portion and a lower portion, wherein the upper portion comprises a pair of lateral side elements, and wherein said lateral side elements include grooves for engaging with the at least one of the seed guards.

13. The seed planting machine of claim 9, wherein said metering wheel comprises a plurality of fluted sections on an exterior radial surface of said metering wheel, wherein said fluted sections are configured to receive seed from the seed inlet.

14. The seed planting machine of claim 13, wherein each seed guard comprises a base section and a tip section, wherein in the operating configuration said tip section extends under said seed inlet to direct seed into the fluted sections.

15. The seed planting machine of claim 13, wherein said fluted sections of said metering wheel each extend along a direction parallel with a rotational axis of said metering wheel.

16. The seed planting machine of claim 13, wherein each fluted section has a uniform cross section along a length of said fluted section.

17. The seed planting machine of claim 13, wherein said fluted sections are evenly spaced circumferentially about the exterior radial surface of said metering wheel.

18. The seed planting machine of claim 9, further comprising includes one or more ground-engaging mechanisms configured to provide rotation to the seed meter as the seed planting machine travels forward and rearward.

* * * * *